Oct. 3, 1967   M. KRAKAUER ETAL   3,344,953
ARTICLE VENDING MACHINE HAVING HELICAL FEEDER COIL
Filed Feb. 18, 1965   4 Sheets-Sheet 1

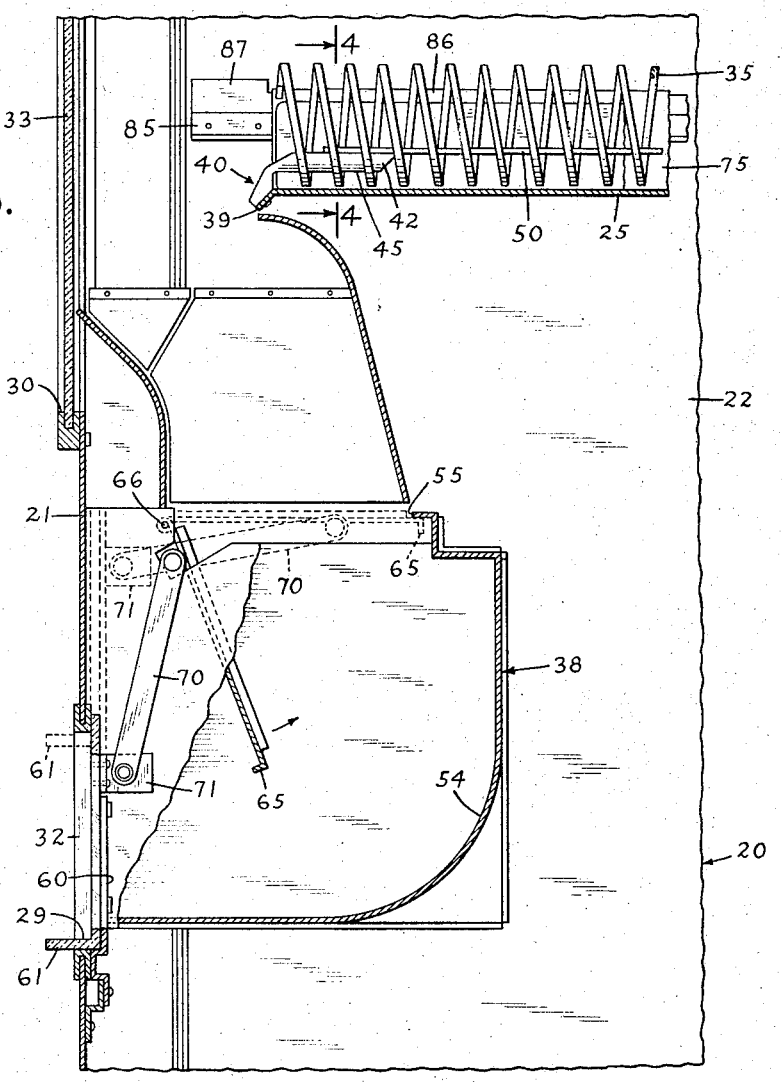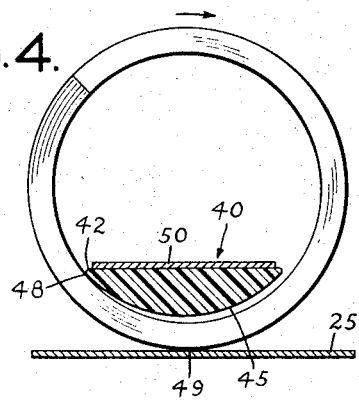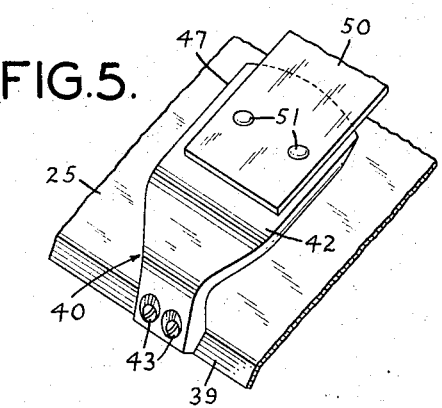

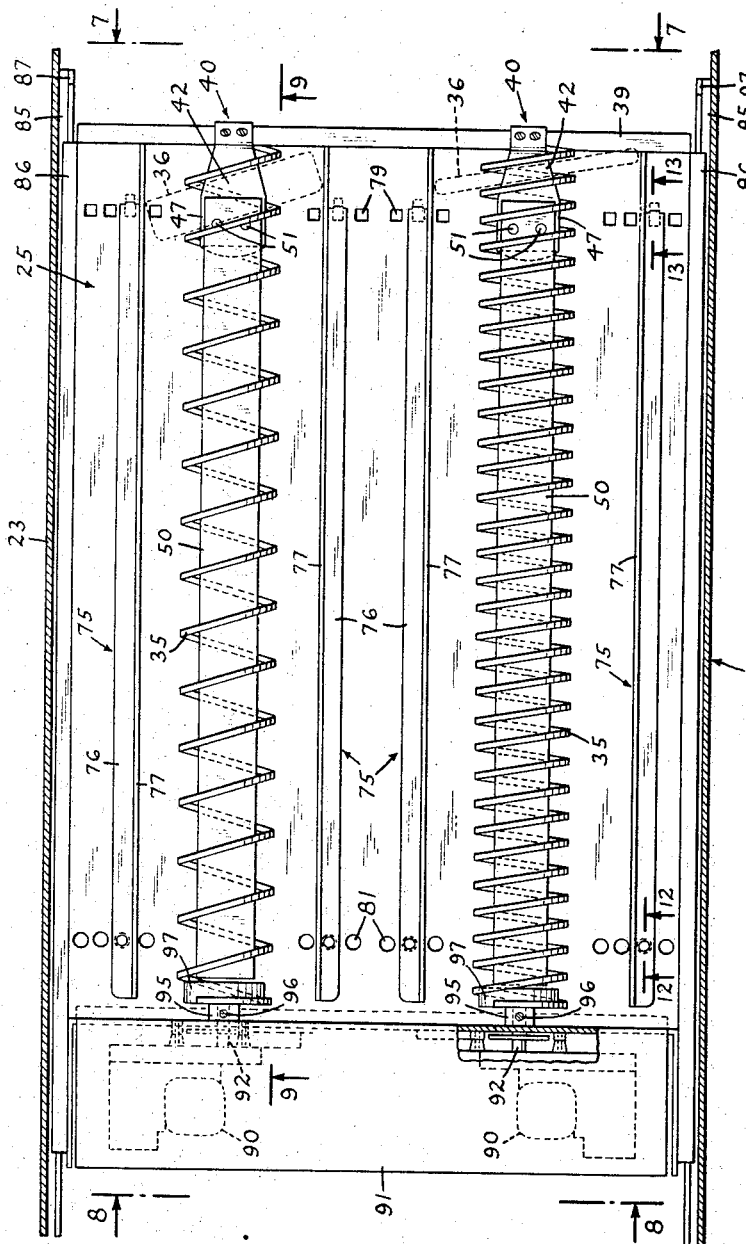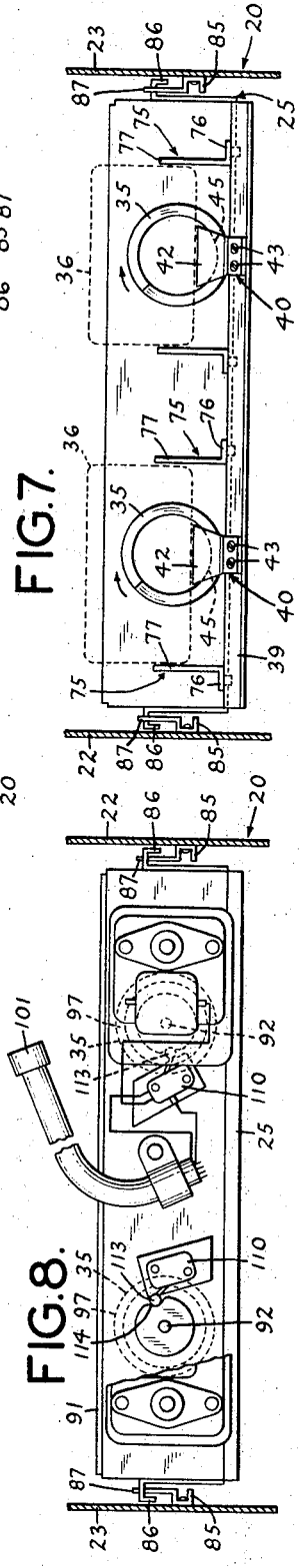

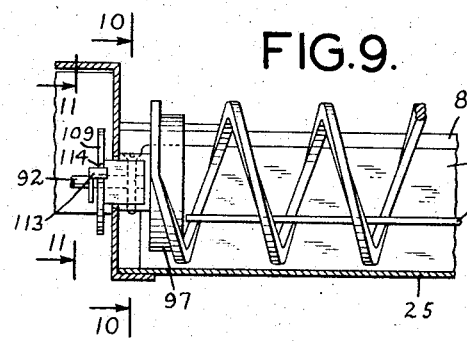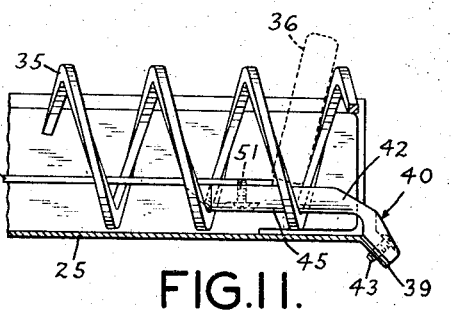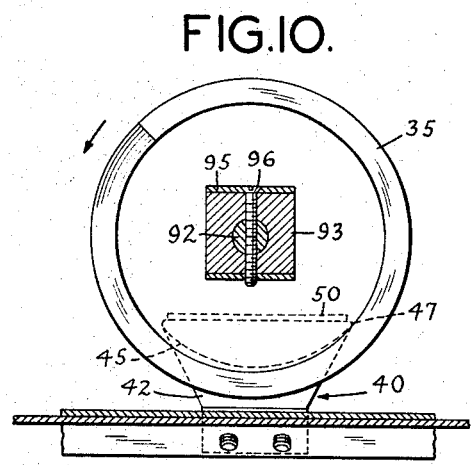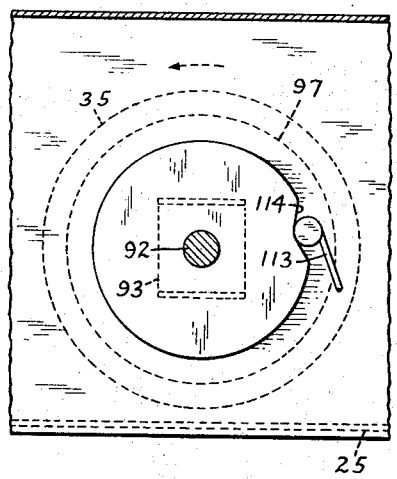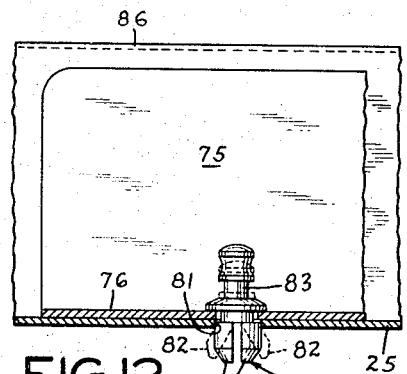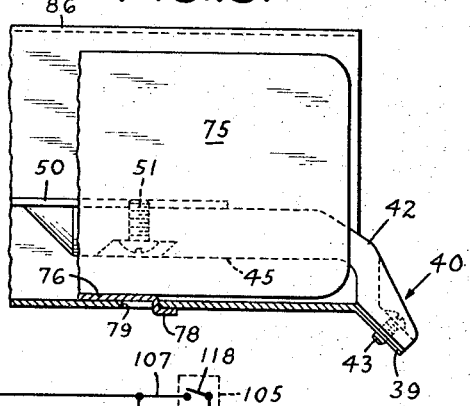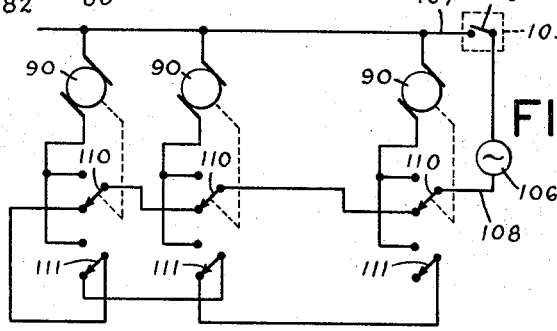

United States Patent Office 3,344,953
Patented Oct. 3, 1967

3,344,953
ARTICLE VENDING MACHINE HAVING
HELICAL FEEDER COIL
Merrill Krakauer, 57 Falcon Road, Livingston, N.J. 07039, and Henry E. Verbeke, Tanners Brook Road, Chester, N.J. 07930
Filed Feb. 18, 1965, Ser. No. 433,603
18 Claims. (Cl. 221—75)

This application is a continuation-in-part of U.S. application Ser. No. 400,983 filed Oct. 2, 1964, by Merrill Krakauer and Henry E. Verbeke (Patent No. 3,269,595).

This invention relates to vending machines and more particularly to machines for automatically delivering candy bars, cigarettes packages or other articles to be vended in response to a control signal.

Vending machines of the type to which the present invention is directed, while of general application, are particularly well suited for use in the delivery of successive articles to be vended to the discharge portion of the machine upon the energization of a coin-operated control mechanism. Such machines customarily include a plurality of helical feeder coils which are oriented within the casing of the machine above a suitable delivery opening. The articles to be vended are positioned within the convolutions of the coils such that, upon the rotation of a particular coil in response to actuation of the control mechanism, one of the articles is directed toward the delivery opening, where it is available to the purchaser.

Heretofore, automatic vending machines of the foregoing type have exhibited certain disadvantages. For example, it previously has been difficult to accurately guide the helical feeder coils to insure the smooth and uniform rotation thereof with a minimum of frictional resistance. In many types of machines, it is desirable to employ comparatively long coils, to accommodate a maximum number of articles and thereby reduce the need for frequent reloading of the machine. However, the increased length of the coils has further compounded the difficulties incident to accurately guiding each coil as it rotates. In addition, and this has been of special moment in situations in which the feeder coils were positioned in close proximity with the delivery opening of the machines, difficulties often were encountered heretofore in preventing unauthorized access between the delivery opening and the articles on the coils. Furthermore, in many prior machines the particular articles to be vended were not readily visible to the purchaser, with the result that all of the articles on a given coil needed to be of a similar type and required appropriate ancillary identification and that sensing devices frequently were required to de-energize the drive mechanism for the coil when its supply of articles became exhausted.

One general object of this invention, therefore, is to provide a new and improved vending machine for automatically delivering successive articles to be vended.

More specifically, it is an object of this invention to provide a machine of the character indicated having at least one helical feeder coil which is accurately guided as it rotates with a minimum of frictional resistance.

Another object of this invention is to provide such machine in which the unauthorized removal of articles from the convolutions of the feeder coil is affirmatively prevented at all times.

A further object of the invention is to provide an automatic vending machine in which the particular article to be vended is visible to the purchaser.

Still another object of the invention is to provide a vending machine utilizing comparatively simple mechanical and electrical components which is economical to manufacture and thoroughly reliable in operation.

In one illustrative embodiment of this invention, the helical feeder coil is supported for rotation on a substantially flat shelf carried within the casing of the machine, the forward portion of the shelf being spaced from the front wall of the casing. A delivery opening is provided in the front casing wall beneath the shelf, and unique article receiving means is located immediately adjacent the delivery opening. The articles to be vended are interposed between the convolutions of the feeder coil such that, upon the rotation of the coil through a single complete revolution, the foremost article is advanced toward the front of the machine and then drops to the article receiving means in position to be received by the purchaser.

In accordance with one feature of certain particularly advantageous embodiments of the invention, there is provided novel guide means which extends at least partly within the helical feeder coil to insure that the coil's axis of rotation remains substantially stationary at all times. The coil in effect is guided from the inside, with the result that the construction of the machine is considerably simplified and the available space on the shelf is utilized with maximum efficiency.

In accordance with another feature of the invention, in several preferred embodiments, the guide means includes a portion which is provided with a curved surface of low friction material. This portion engages at least one of the convolutions of the helical feeder coil at a single discrete point. The upper surface of the supporting shelf extends substantially continuously from one side of the casing to the other in a single flat plane, and the feeder coil rests on this surface with each convolution engaging the shelf at a second discrete point. The arrangement is such that each convolution of the rotating coil contacts its supporting structure at not more than two points, thereby substantially reducing the frictional resistance to the coil's rotary movement.

In accordance with still another feature of the invention, in some embodiments, the guide means for the helical feeder coil includes a second, elongated portion which extends substantially entirely from one end of the coil to the other and serves to facilitate the support of the successive articles carried by the coil. This arrangement is particularly advantageous in cases in which the articles being vended comprise loosely wrapped candy bars, for example, to further insure the smooth and continuous movement of the articles as the coil rotates.

In accordance with a further feature of the invention, in several good arrangements, the machine includes a door which is arranged to normally close the delivery opening but is movable to an open position to permit access to an article received by the article receiving means. A second, normally open door is carried by the article receiving means intermediate the delivery opening and the helical feeder coil. The second door is linked to the delivery opening door such that, upon the opening of the latter to gain access to the delivered article, the second door automatically moves to its closed position to affirmatively prevent unauthorized access to the articles remaining on the coil.

In accordance with still another feature of certain embodiments of the invention, the casing of the machine includes a viewing opening which is disposed in the front wall portion above the delivery opening. The axis of the helical feeder coil extends from front to back with respect to the casing and is oriented at the level of the viewing opening such that at least the foremost article carried by the coil is visible to the purchaser. As a result, the purchaser may observe the particular article he intends to buy and may ascertain whether the supply of articles has been exhausted. Accordingly, there no longer is any necessity for providing dummy articles or other ancillary indicia adjacent the coil to identify the articles or for employing sensing devices, etc. to de-energize the drive mechanism for the coil upon the depletion of the supply of articles.

In accordance with a further feature of the invention, in some embodiments, there is provided a novel control circuit for the helical feeder coil which insures the accurate and precise control of the coil's rotary movement.

The present invention, as well as further objects and features thereof, will be understood more clearly and fully from the following detailed description of a preferred embodiment thereof, when read with reference to the accompanying drawings, in which:

FIGURE 3 is an enlarged fragmentary sectional view taken generally along the line 3—3 of FIGURE 1, with a portion of the article receiving mechanism of the machine shown in elevation;

FIGURE 4 is a still further enlarged fragmentary sectional view taken along the line 4—4 in FIGURE 3;

FIGURE 5 is a fragmentary isometric view showing certain of the parts illustrated in FIGURE 4;

FIGURE 6 is an enlarged horizontal sectional view taken along the line 6—6 of FIGURE 1, with certain portions omitted for clarity;

FIGURE 7 is a front elevational view of a portion of the machine as seen from the line 7—7 in FIGURE 6, with certain parts broken away and others omitted for purposes of clarity;

FIGURE 8 is a rear elevational view of the portion of the machine shown in FIGURE 7 as seen from the line 8—8 in FIGURE 6, with certain parts broken away and others omitted for purposes of clarity;

FIGURE 9 is an enlarged fragmentary sectional view taken along the line 9—9 in FIGURE 6;

FIGURE 10 is a still further enlarged sectional view taken along the line 10—10 in FIGURE 9;

FIGURE 11 is a sectional view similar to FIGURE 10 but taken along the line 11—11 of FIGURE 9;

FIGURE 12 is an enlarged fragmentary sectional view taken along the line 12—12 of FIGURE 6;

FIGURE 13 is a fragmentary sectional view similar to FIGURE 10 but taken along the line 13—13 of FIGURE 6; and FIGURE 14 is a schematic diagram of an electrical circuit for controlling certain portions of the machine.

Figure 2:
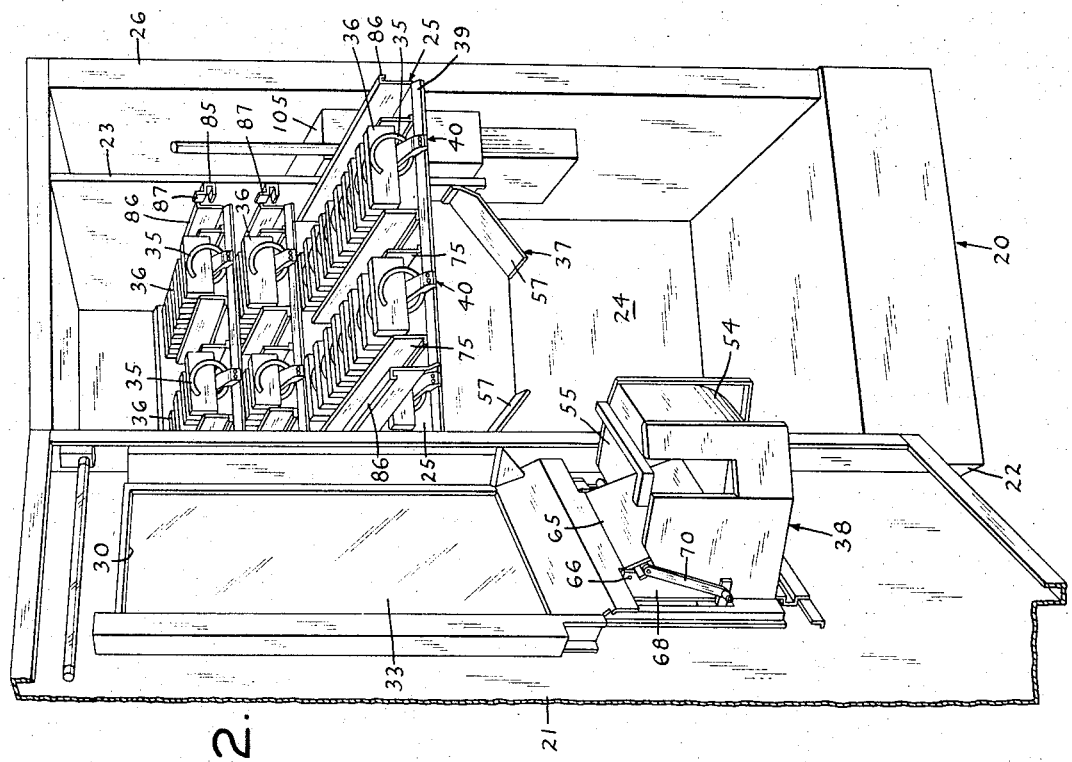
FIGURE 2 is a front perspective view in general similar to FIGURE 1 but showing the front door of the machine in an open position and partially broken away, with one of the article supporting shelves partially withdrawn from the casing.
Figure 1:
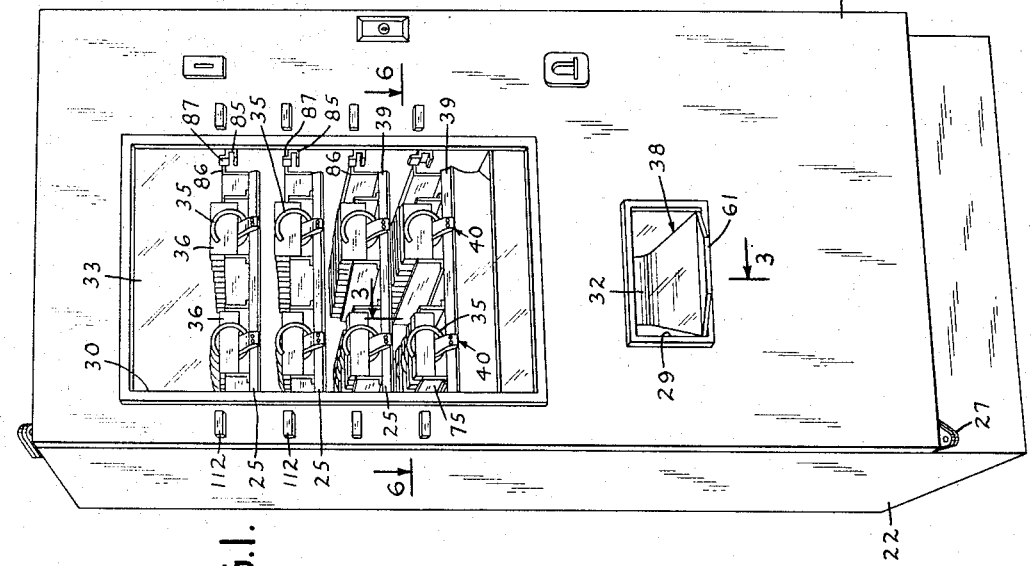
FIGURE 1 is a front perspective view of an automatic vending machine in accordance with one illustrative embodiment of the invention, with the front door of the machine in its closed, vending position.

Referring to FIGURES 1 and 2 of the drawings, there is shown an automatic vending machine which includes a casing or housing indicated generally at 20. The casing 20 is approximately rectangular in both horizontal and vertical section and is provided with a front wall portion in the form of a hinged door 21, two side wall portions 22 and 23 and a rear wall portion 24. Four horizontally extending shelves 25 are slidably positioned one above the other within the casing 20 with their forwardly extending portions spaced from the front wall portion 21. Each of the shelves 25 is of integral, one-piece construction and extends substantially continuously from the side wall portion 22 to the side wall portion 23 in a single flat plane. The wall portion 23 is in spaced relationship with an outer wall 26 to define an area for the installation of certain portions of the control mechanism of the machine, to be more fully described hereinafter.

The front wall portion or door 21 is supported for pivotal movement about a vertical axis by a hinge 27. The door 21 includes a delivery opening 29 and a considerably larger viewing opening 30 which is oriented above the delivery opening. The delivery opening is disposed adjacent the lower part of casing 20 and is provided with a transparent door 32 slidably carried by the casing. The viewing opening 30 is positioned at the approximate level of the shelves 25 and is effective to expose all of the shelves to the purchaser. Access to the shelves is prevented by a transparent plate 33 covering the opening 30 through which the contents of the shelves can be viewed.

Resting on the upper surface of each of the flat shelves 25 are two helical feeder coils 35, there being a total of eight such coils in the machine specifically illustrated in the drawings. The candy bars or other articles 36 to be vended are interposed between the convolutions of the feeder coils 35 with all of the articles on a given coil customarily being of the same type. The feeder coils 35 preferably are fabricated from elongated strips of flattened, rectangular cross-section and are positioned on the shelves 25 with the flat faces of the individual convolutions arranged to bear against the articles 36 therebetween. Each of the coils 35 is rotatably carried entirely above the plane of the corresponding shelf 25 with the axes of the coils disposed at the level of the viewing opening 30 and extending from front to back with respect to the casing 20. With this arrangement, the articles 36 are visible to the purchaser through the opening 30.

Each of the helical feeder coils 35 is adapted for rotation, in a manner that will become more fully apparent hereinafter, in a direction to advance a selected article 36 toward the space between the forward portion of the corresponding shelf 25 and the front wall portion 21. The selected article drops from this space through a discharge chute 37 to an article receiving mechanism 38. The mechanism 38 is supported by the casing portion 21 immediately adjacent the delivery opening 29. Upon the opening of the delivery opening door 32, the purchaser may obtain access to the selected article.

The shelves 25 are bent downwardly at an angle along their forward edges to form front flanges 39. As best shown in FIGURES 3, 5 and 9, each flange 39 rigidly supports a guide assembly indicated generally at 40. The assembly 40 includes a guiding portion 42 which is fixedly secured to the flange 39, as by set screws 43, and extends at least partly within the forward portion of the adjacent feeder coil 35. The guiding portion 42 preferably is fabricated from a material having a low coefficient of friction. Although a wide variety of materials may be employed for the portion 42, nylon and similar thermoplastic low-friction materials are particularly well suited for this purpose. The portion 42 is of generally semi-cylindrical configuration and has a radius which is slightly smaller than that of the feeder coil 35.

During the time the helical feeder coil 35 is at rest, the curved low-friction surface 45 of the guide portion 42 is symmetrically disposed in spaced relationship with the inner rims of the three forwardmost convolutions of the coil. Upon the rotation of the feeder coil 35 in a clockwise direction, as viewed in FIGURE 4, the forward portion of the coil exhibits a tendency to move to the right from the position shown in the figure. However, the inner rims of the forwardmost convolutions each engage the longitudinal edge 47 of the portion 42 at a single discrete point 48 to hold the axis of the coil in a substantially stationary position. The portion 42, together with the shelf 25, serve as a support structure for the rotating coil, and the outer rim of each of the convolutions of the coil contacts the upper surface of the shelf 25 at a second single discrete point 49. By arranging each convolution such that it contacts its support structure at not more than two discrete points, one on the inside of the convolution and one on the outside, the frictional resistance to the coil's rotary movement is exceedingly small. In some cases the upper shelf surface may be provided with a paint or coating of low-friction material to further reduce the resistance to the rotation of the coil.

The guide assembly 40 additionally includes an elongated portion 50 which is in the form of a narrow flat plate. The plate 50 is disposed substantially entirely within the helical feeder coil 35 and extends from one end of the coil to the other. The forwardly located end of the portion 50 is suitably affixed, as by rivets or screws 51, for example, to the flat upper surface of the guiding portion 42, while the rearward end is spaced above the inner rims of the rearward convolutions of the coil. As the coil rotates, the portion 50 serves to support the successive articles 36 moving toward the front wall portion 21. The use of the portion 50 is particularly advantageous in embodiments in which the articles to be vended have comparatively loose packaging which might otherwise snag or tear on the portion 42 or on other portions of the machine. In cases in which the portion 50 is omitted, it sometimes is desirable to chamfer the inwardly extending edge of the portion 42 to further insure against this possibility.

The article receiving mechanism 38 is of generally box-shaped configuration, with its forward portion open and in juxtaposition with the delivery opening 29. The rearwardly directed portion of the receiving mechanism 38 is defined by a curved plate 54 (FIGURE 3) which facilitates the smooth transfer of the vended articles to a position adjacent the opening 29. The upper portion of the mechanism 38 is provided with an opening 55. This opening is disposed immediately beneath a pair of deflector plates 57 which are respectively affixed to the side walls 22 and 23 of the casing 20 and extend downwardly at an angle with respect to the horizontal between the lowermost shelf 25 and the opening 55. The plates 57 partially define the discharge chute 37 and further facilitate the movement of the vended articles from the helical feeder coils 35 to the mechanism 38.

The delivery opening door 32 is arranged for vertical sliding movement in a pair of guides 60 (only one of which is visible in FIGURE 3) carried by the front wall portion 21 of the casing 20. The door 32 includes a flange-shaped handle 61 which facilitates the movement of the door from its closed position (the position shown in full lines in FIGURE 3) to its open, dotted line position to permit the vended article to be manually removed from the receiving mechanism 38 by the purchaser.

In order to prevent the unauthorized removal of the articles remaining between the convolutions of the helical feeder coils 35, as by the insertion of a hand or implement through the delivery opening 29 and upwardly between the deflector plates 57, the article receiving mechanism 38 is provided with a second or trap door 65. The door 65 is pivotally connected, as at 66, to the side walls 68 of the mechanism 38 immediately above the delivery opening 29. The door 65 and the delivery opening door 32 are interconnected by a pair of links 70, only one of which is visible in FIGURE 3. One end of each link 70 is pivotally affixed to the door 65 at a point which is spaced from the pivotal axis 66. The opposite end of the link is similarly secured to an inwardly protruding block 71 carried by the upper portion of the door 32.

In the normal, unoperated positions of the delivery opening door 32 and the second door 65, the door 32 remains closed, while the length of the links 70 is such that the door 65 is open to permit the free movement of a selected article 36 from one of the helical feeder coils 35 through the chute 37 to the article receiving mechanism 38. Upon the opening of the door 32 to obtain access to the article within the mechanism 38, the links 70 are urged in a generally upward direction to pivot the door 65 counterclockwise, as viewed in FIGURE 3, to a position (shown in dotted lines in this figure) blocking the opening 55. The door 65 is thus effective to completely close the opening 55 when the door 32 is in its open position to affirmatively prevent access to the helical feeder coils 35. As the door 32 is released and returns to its closed position, the door 65 is again opened preparatory to the selection of the next article.

As best shown in FIGURE 6, each of the helical feeder coils 35 is provided with a pair of guide rails 75 which further facilitate the movement of the articles 36 toward the forward edge of the corresponding shelf 25. One of the rails 75 in each pair is disposed in spaced relationship with one side of the adjacent feeder coil 35, while the other rail is similarly spaced from the opposite side of the coil. Each of the rails 75 is separately connected to the shelf 25 and may be disposed in any one of a plurality of different positions parallel to the coil 35. Each rail is of L-shaped cross-section and includes a horizontally extending flange 76 and an upstanding flange 77. The flanges 77 of each pair of rails are spaced apart by a distance slightly greater than the length of the particular articles carried by the associated feeder coil such that, should a given article exhibit a tendency to become misaligned, one end of the article will contact one of the flanges 77 to return the article to its proper position.

The horizontal flange 76 of each of the guide rails 75 is provided adjacent its forward edge with an angular tongue 78 (FIGURE 13). The tongue 78 extends in a generally downward direction and may be removably inserted into any one of a plurality of square apertures 79 in the shelf 25 which extend in a transverse row a short distance to the rear of the shelf flange 39. The rearwardly directed portion of the flange 76 is removably connected to the shelf 25 by a known type of head and socket fastener 80 (FIGURE 12). The fastener 80 is removably inserted in one of a plurality of circular apertures 81 which are aligned in a transverse row adjacent the rearward edge of the shelf. The head element of the fastener 80 is fabricated from a suitable resilient plastic material and is provided with a pair of spring fingers 82. These fingers normally are contracted so as to pass smoothly through a selected one of the apertures 81 but are expanded after the element has passed through the selected aperture by a reciprocating plunger 83, thereby preventing the element from being accidentally pulled out of the aperture.

The guide rail 75 is fastened to the shelf 25 by placing the tongue 78 in a selected one of the apertures 79 and then inserting the head element of the fastener 80 in the corresponding aperture 81. The apertures are selected such that the rail 75 is located at a predetermined distance from the corresponding feeder coil 35 in accordance with the length of the particular articles 36 carried thereby.

As indicated heretofore, each of the shelves 25 is slidably mounted in the casing 20. The shelves 25 are arranged such that they may be either pulled partially out of the casing, to the position shown by the partially withdrawn shelf in FIGURE 2, for example, for facilitating the insertion of the articles 36 between the convolutions of the helical feeder coils 35, or the shelves may be entirely removed from the casing for maintenance purposes, etc. As best shown in FIGURES 7 and 8, the casing side walls 22 and 23 are provided with support rails 85, there being two support rails for each of the shelves 25. The support rails 85 may be vertically spaced apart different distances to provide a corresponding spacing for the shelves 25 and thereby accommodate articles of different sizes. In the illustrated embodiment, the support rails 85, and hence the shelves 25, extend horizontally, although in other good arrangements the support rails are tilted downwardly such that the shelves form a substantial angle (e.g., seventeen degrees) with respect to the horizontal. Integrally formed along each side of the shelves 25 is a hanger rail 86 which is slidably carried by and depends from the corresponding support rail 85. The forwardly disposed end of each of the support rails is provided with an upstanding lug 87. The lug 87 is in position to be contacted by the forward edge of the corresponding hanger rail 86 to prevent the shelf 25 from becoming accidentally displaced.

To remove a given shelf 25 from the casing 20, the forward portion of the shelf is raised slightly to move the hanger rails 86 to positions above the lugs 87. The shelf 25 may then be withdrawn either partially or completely from its position. In cases in which the shelves are mounted at an angle with respect to the horizontal, each support rail and hanger rail assembly is provided with a suitable catch (not visible in the drawings) intermediate its ends to hold the shelf in its partially withdrawn position.

The rotary movement of each of the helical feeder coils 35 is controlled by an electric motor and speed reduction unit indicated generally at 90 (FIGURE 6). Two of the units 90 are provided for each of the shelves 25 and are respectively affixed adjacent the feeder coils 35 to a transversely extending bracket 91 which is carried by the rearwardly disposed edge of the shelf. As best shown in FIGURES 9 and 10, the output shaft 92 of each of the speed reduction units is disposed within a centrally located aperture in a stud 93 of substantially square cross-section. A bracket 95 is separably connected to the stud 93 by a screw 96. This bracket is rigidly secured to a cylindrical coupling block 97 which extends coaxially within the rearwardmost portion of the helical feeder coil 35 and is welded or otherwise affixed thereto. With this arrangement, the feeder coil with its coupling block may be readily detached from the shelf by removing the guide assembly 40 and by withdrawing the screw 96. This construction permits the easy and quick interchange of feeder coils having different pitches, such as the two feeder coils shown in FIGURE 6, for example, to accommodate articles of increased or decreased thickness.

The two drive motors 90 on each of the shelves 25 are provided with a common supply cable 100 (FIGURE 8) and a common plug 101. The cable 100 and the plug 101 electrically connect the two motors in series so that each shelf and its feeder coils and motors may be handled as a unit. The motors on all of the shelves are operated under the control of a coin-operated control mechanism indicated schematically at 105 and are connected in a circuit shown in FIGURE 14.

In many types of automatic vending machines, it has been common practice in the past to utilize a relay or other circuit controlling device between an article selection switch and a motor to take away from the customer-operator the direct control of the motor and thereby prevent the possibility of the operation of two motors at the same time in an attempt to obtain the delivery of an article by each motor. The control circuit of FIGURE 14 eliminates the need for using circuit controlling devices of this character while at the same time insuring that not more than one motor may be operated simultaneously.

Each of the drive motors 90 comprises a known type of positive brake motor which stops substantially instantaneously such that the motor shaft cannot rotate more than 180° after the power is shut off. Although a wide variety of motors may be employed for this purpose, one motor that has exhibited particularly good results is the 3000 r.p.m. A.C. motor available commercially from the Speedway Manufacturing Co., Chicago, Illinois, and sold under their designation "Positive Brake Type 40AHX." The corresponding speed reduction unit illustratively provides a reduction ratio of 150:1, the output shaft 92 rotating at about 20 r.p.m.

For simplicity, only three of the drive motors 90 have been shown in the circuit of FIGURE 14. The circuit includes a source 106 of alternating current which is connected across supply lines 107 and 108. The supply line 107 is provided with a normally open switch 118 which is disposed within the coin-operated control mechanism 105 and is moved to its closed position in response to a control signal generated thereby. One terminal of each of the motors 90 is connected to the supply line 107, while the opposite terminal leads to one of the stationary contacts of a two-position, multi-contact bypass switch 110. The circuit includes three of these bypass switches, one for each motor, and the movable arms 113 (FIGURE 11) of the switches are connected in series with each other and with the supply line 108. The switch arms 113 are each disposed in a peripheral notch 114 in a cooperating cam disc 109 on the output shaft 92.

The control circuit additionally includes a two-position, multi-contact selection switch 111 for each of the motors 90. The switches 111 are connected in series with each other and also with the bypass switches 110 leading to the supply line 108. Each of the switches 111 is controlled by a finger piece 112 (FIGURE 1) which is mounted in the front casing wall 21 in juxtaposed relationship with the feeder coil 35 for the corresponding motor 90. The switches 111 are spring biased toward the positions shown in FIGURE 14 to provide an electrically conductive path from the supply line 108, through the successive switches 110 and then through the successive switches 111.

Upon the insertion of a suitable coin into the control mechanism 105, a control signal is produced which is effective to close the switch 118, thus connecting one terminal of each of the drive motors 90 to the A.C. source 106. When one of the finger pieces 112 is depressed, the corresponding selection switch 111 is actuated to connect the opposite terminal of the associated motor 90 to the source 106 and thereby energize the motor. As the output shaft 92 (FIGURE 13) begins rotating, the cam disc 109 similarly rotates to urge the switch arm 113 for the bypass switch 110 away from the notch 114. The switch 110 moves from the position shown in FIGURE 14 into engagement with the stationary contact leading to the motor 90 to provide a holding circuit for the motor. Although the release of the finger piece 112 returns the selection switch 111 to its initial position, the switch 110 maintains the motor 90 in an energized condition until the shaft 92 completes a full revolution. The arm 113 then again enters the notch 114 to stop the motor.

In cases in which the finger pieces 112 are pushed to operate two or more of the selection switches 111 at the same time, only the drive motor 90 controlled by the selection switch closest to the A.C. source 106 is energized. The circuit for the remaining drive motors is broken by the actuated switch closest to the source. With this arrangement, the simultaneous energization of more than one drive motor is affirmatively prevented.

Upon the energization of a selected drive motor 90, the helical feeder coil 35 therefore begins to rotate in a clockwise direction, as viewed in FIGURE 4. As indicated heretofore, this clockwise movement ordinarily would exhibit a tendency for the forward end of the coil 35 to move to the right from the position shown in this figure. However, the inner rims of the forwardly directed convolutions of the coil immediately engage the longitudinal edge 47 of the stationary guide portion 42. This engagement serves to hold the forward end of the coil in its proper position and to maintain the coil's axis of rotation substantially stationary at all times.

As the feeder coil 35 rotates, the inner rim of the forwardmost convolution engages the longitudinal edge 47 on the guide portion 42 at the single discrete point 48. The outer rim of this convolution contacts the flat upper surface of the shelf 25 at the second single discrete point 49. Similarly, the remaining convolutions of the coil each contact its supporting structure at not more than two points, with the result that the coil rotates in a uniform and smooth manner with a minimum of frictional resistance. This frictional resistance is further reduced by the low-friction material used for the guide portion 42 and the low-friction coating on the upper surface of the shelf 25.

During the rotation of the helical feeder coil 35 through a complete revolution, the articles 36 carried thereby are moved toward the space between the forward edge of the shelf 25 and the front wall portion 21 of the casing 20. The foremost article 36, that is, the article which is most clearly visible to the purchaser, drops off the shelf and through this space to the chute 37. The foremost article moves down the chute to the article receiving mechanism 38, where it rests on the horizontal portion of the curved plate 54 in position to be received by the purchaser.

Upon the opening of the delivery opening door 32, the article on the plate 54 may be received by the purchaser. As the door 32 opens, the links 70 act on the door 65 to move this latter door to its closed position and thereby prevent access to the remaining articles on the feeder coil 35. Upon the closing of the door 32, the door 65 is again opened to permit the discharge of a succeeding article to the article receiving mechanism upon the subsequent energization of one of the drive motors 90.

In certain advantageous embodiments of the invention, the door 65 may be eliminated, and the delivery opening door 32 may be arranged to pivot from a vertical position blocking the delivery opening 29 to a substantially horizontal position in which the door closes the opening 55. In other good arrangements, an articulated, flexible door may be substituted for the door 32 and may be similarly arranged to alternately block the openings 29 and 55. Other types of door constructions for preventing the unauthorized access to the articles on the feeder coils also may be employed without departing from the spirit or scope of the invention as defined by the appended claims.

In the illustrated embodiment, there are provided a plurality of drive motors, one for each of the helical feeder coils. In other cases only a single drive motor is employed and is suitably connected to the individual coils through a series of clutches of conventional construction. This latter arrangement is particularly advantageous in situations in which it is desired to further reduce the overall cost of the machine.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. An article vending machine comprising, in combination, a casing including a front wall portion having a delivery opening therein, article receiving means supported by said casing adjacent said delivery opening, shelf means positioned within said casing in spaced relationship with said article receiving means, a helical feeder coil rotatably carried on said shelf means with the axis of said coil extending from front to back with respect to said casing, the articles to be vended being disposed between the convolutions of said helical feeder coil, a supply of electrical power, drive means connected to said supply for rotating said helical feeder coil in a direction to advance successive articles carried thereby toward said front wall portion, the foremost article moving from said feeder coil to said article receiving means, said drive means including an electric positive brake motor that stops substantially instantaneously after the power has been shut off, and guide means disposed within said helical feeder coil in fixed relationship with said shelf means, said guide means including a curved surface of low friction material for guiding said feeder coil as it rotates, said guide means engaging at least one of the convolutions of the rotating feeder coil at a single discrete point.

2. An article vending machine of the character set forth in claim 1, said article receiving means including a door normally closing said delivery opening but movable to an open position to permit access to articles received by said article receiving means, and means responsive to the movement of said door to said open position for preventing access to the articles carried by said helical feeder coil.

3. An article vending machine of the character set forth in claim 1, said shelf means comprising a shelf member extending substantially entirely in a single flat plane within said casing, said helical feeder coil resting on the upper surface of said shelf member, said shelf member and said guide means serving as a support structure for said coil, the convolutions of said coil which contact said shelf member each engaging the same at a second single discrete point, whereby each of the convolutions of the rotating coil contacts said support structure at not more than two discrete points.

4. An article vending machine comprising, in combination, a casing including a front wall portion having a delivery opening therein, article receiving means supported by said casing adjacent said delivery opening, shelf means positioned within said casing in spaced relationship with said article receiving means, a helical feeder coil rotatably carried on said shelf means with the axis of said coil extending from front to back with respect to said casing, the articles to be vended being disposed between the convolutions of said helical feeder coil, means for rotating said helical feeder coil in a direction to advance successive articles carried thereby toward said front wall portion, the foremost article moving from said feeder coil to said article receiving means, and guide means disposed within said helical feeder coil in fixed relationship with said shelf means, said guide means including a generally semi-cylindrical portion for guiding said feeder coil as it rotates and an elongated portion extending substantially entirely from one end of said feeder coil to the other for supporting the successive articles moving toward said front wall portion, the curved surface of said semi-cylindrical portion being of low friction material and engaging at least one of the convolutions of the rotating feeder coil at a single discrete point.

5. An article vending machine comprising, in combination, a casing having a delivery opening therein, article receiving means supported by said casing adjacent said delivery opening and including a door normally closing said opening, said door being movable to an open position to permit access to articles received by said article receiving means, shelf means positioned within said casing in spaced relationship with said article receiving means, a helical feeder coil rotatably carried by said shelf means with the articles to be vended interposed between the convolutions of said coil, means for rotating said helical feeder coil in a direction to advance a selected article carried thereby toward said article receiving means, said selected article being received by said article receiving means for withdrawal through said delivery opening upon the movement of said door to said open position, means responsive to said movement of said door for preventing access to the articles carried by said helical feeder coil, and means for guiding said helical feeder coil as it rotates, said last-mentioned means including a generally semi-cylindrical portion disposed at least partly within said helical feeder coil and having a radius of curvature which is less than that of said coil.

6. An article vending machine comprising, in combination, a casing including a front wall portion having a delivery opening therein, article receiving means supported by said casing adjacent said delivery opening, a door normally closing said delivery opening but movable to an open position to permit access to articles received by said article receiving means, shelf means positioned within said casing above said delivery opening, said shelf means having edge portions adjacent the sides of said casing and a flat surface extending substantially continuously between said edge portions, means disposed along said edge portions for supporting said shelf means within said casing, a helical feeder coil rotatably carried on said surface of said shelf means with the articles to be vended disposed between the convolutions of said coil, the axis of said helical feeder coil extending from front to back with respect to said casing, means for rotating said helical feeder coil in a direction to advance a selected article carried thereby toward said article receiving means, said selected article being received by said article receiving means for withdrawal through said delivery opening upon the movement of said door to said open position, means responsive to said movement of said door for preventing access to the articles carried by said helical feeder coil, and means extending at least partly within said helical feeder coil for guiding the same as it rotates.

7. An article vending machine comprising, in combination, a casing including a wall portion having a delivery opening therein, article receiving means supported by said casing adjacent said delivery opening, first door means normally closing said delivery opening but manually movable to an open position to permit access to articles received by said article receiving means, shelf means positioned within said casing above said delivery opening, a helical feeder coil rotatably carried by said shelf means with the articles to be vended interposed between the convolutions of said coil, means for rotating said helical feeder coil in a direction to advance a selected article carried thereby toward said article receiving means, said selected article being received by said article receiving means for withdrawal through said delivery opening upon the movement of said first door means to said open position, second door means interposed between said first door means and said helical feeder coil for preventing access to the articles carried thereby when said first door means is in said open position, and means for controlling the rotary movement of said helical feeder coil, said last-mentioned means including a generally semi-cylindrical portion disposed at least partly within said helical feeder coil and having a radius of curvature which is less than that of said coil.

8. An article vending machine of the character set forth in claim 7 and further comprising means interconnecting said first door means and said second door means for normally holding the latter in position to permit the movement of said selected article to said article receiving means but for closing said second door means in response to the movement of said first door means to said open position.

9. An article vending machine comprising, in combination, a casing including a front wall portion having a viewing opening and a delivery opening beneath said viewing opening, article receiving means supported by casing adjacent said delivery opening, a door normally closing said delivery opening but movable to an open position to permit access to articles received by said article receiving means, shelf means positioned within said casing above said delivery opening, the forward portion of said shelf means being spaced from said front wall portion, a helical feeder coil rotatably carried by said shelf means, the axis of said helical feeder coil being disposed at the level of said viewing opening and extending from front to back with respect to said casing, whereby an article interposed between the convolutions of said coil is visible through said viewing opening, means for rotating said helical feeder coil in a direction to advance the visible article toward the space between the forward portion of said shelf means and said front wall portion, said article dropping through said space to said article receiving means, and means for guiding said helical feeder coil as it rotates, said last-mentioned means including a generally semi-cylindrical portion disposed at least partly within said helical feeder coil and having a radius of curvature which is less than that of said coil.

10. An article vending machine comprising, in combination, a casing including a front wall portion having a viewing opening and a delivery opening beneath said viewing opening, article receiving means supported by said casing adjacent said delivery opening, an integral, one-piece shelf positioned within said casing above said delivery opening and extending substantially continuously from one side of said casing to the other in a single flat plane, the forward portion of said shelf being spaced from said front wall portion, a helical feeder coil rotatably carried entirely above the plane of said shelf with at least a portion of the periphery of said coil resting on the shelf's upper surface, the axis of said helical feeder coil being disposed at the level of said viewing opening and extending from front to back with respect to said casing, whereby an article interposed between the convolutions of said coil is visible through said viewing opening, means for rotating said helical feeder coil in a direction to advance the visible article toward the space between the forward portion of said shelf and said front wall portion, said article dropping through said space to said article receiving means, and guide means rigidly secured to said forward shelf portion and extending within said helical feeder coil, said guide means including a curved surface of low friction material for guiding said feeder coil as it rotates, said guide means engaging at least one of the convolutions of the rotating feeder coil at a single discrete point.

11. An article vending machine comprising, in combination, a casing including a front wall portion having a viewing opening and a delivery opening beneath said viewing opening, article receiving means supported by said casing adjacent said delivery opening, door means normally closing said delivery opening but manually movable to an open position to permit access to articles received by said article receiving means, an integral, one-piece shelf positioned within said casing above said delivery opening and extending substantially continuously from one side of said casing to the other in a single flat plane, the forward portion of said shelf being spaced from said front wall portion, a helical feeder coil rotatably carried entirely above the plane of said shelf with at least a portion of the periphery of said coil resting on the shelf's upper surface, the axis of said helical feeder coil being disposed at the level of said viewing opening and extending from front to back with respect to said casing, whereby an article interposed between the convolutions of said coil is visible through said viewing opening, means for rotating said helical feeder coil in a direction to advance the visible article toward the space between the forward portion of said shelf and said front wall portion, said article dropping through said space to said article receiving means and being received thereby for withdrawal through said delivery opening upon the movement of said door means to said open position, means cooperating with said door means for preventing access to the articles carried by said helical feeder coil when said door means is in said open position, and means extending at least partly within said helical feeder coil for guiding the same as it rotates.

12. An article vending machine comprising, in combination, a casing including a front wall portion having a viewing opening and a delivery opening beneath said viewing opening, article receiving means supported by said casing adjacent said delivery opening, first door means normally closing said delivery opening but manually movable to an open position to permit access to articles received by said article receiving means, an integral, one-piece shelf positioned within said casing above said delivery opening and extending substantially continuously from one side of said casing to the other in a single flat plane, the forward portion of said shelf being spaced from said front wall portion, a helical feeder coil rotatably carried entirely above the plane of said shelf with at least a portion of the periphery of said coil resting on the shelf's upper surface, the axis of said helical feeder coil being disposed at the level of said viewing opening and extending from front to back with respect to said casing, whereby an article interposed between the convolutions of said coil is visible through said viewing opening, means for rotating said helical feeder coil in a direction to advance the visible article toward the space between the forward portion of said shelf and said front wall portion, said article dropping through said space to said article receiving means and being received thereby for withdrawal through said delivery opening upon the movement of said first door means to said open position, second door means interposed between said first door means and said helical feeder coil for preventing access to the articles carried thereby when said first door means is in said open position, and guide means rigidly secured to said forward shelf portion and extending within said helical feeder coil, said guide means including a generally semi-cylindrical portion for guiding said feeder coil as it rotates and an elongated portion extending substantially entirely from one end of said feeder coil to the other for supporting the articles carried thereby, said semi-cylindrical portion being of low friction material and engaging at least one of the convolutions of the rotating feeder coil at a single discrete point.

13. An article vending machine comprising, in combination, a casing including a front wall portion having a delivery opening therein, article receiving means supported by said casing adjacent said delivery opening, shelf means positioned within said casing in spaced relationship with said article receiving means, a helical feeder coil rotatably carried on said shelf means with the axis of said coil extending from front to back with respect to said casing, the articles to be vended being disposed between the convolutions of said helical feeder coil, means including a drive motor supported adjacent one end of said helical feeder coil for rotating the same in a direction to advance successive articles carried thereby toward said front wall portion, the foremost article moving from said feeder coil to said article receiving means, an electric circuit for controlling said drive motor, said circuit including first and second two-position switches each normally in one position for maintaining the circuit through the motor open, said motor being energized upon the movement of said first switch to its other position, means operated by the energized motor for moving said second switch to its other position to continue the operation of the motor for a length of time sufficient to rotate said helical feeder coil in said direction through a single complete revolution, said last mentioned means returning said second switch to said one position as the feeder coil completes its revolution to de-energize said motor, and guide means disposed within said helical feeder coil in fixed relationship with said shelf means for guiding said feeder coil as it rotates, said guide means being supported on said shelf means adjacent the other end of said feeder coil.

14. An article vending machine comprising, in combination, a casing including a front wall portion having a delivery opening therein, article receiving means supported by said casing adjacent said delivery opening, shelf means positioned within said casing in spaced relationship with said article receiving means, a plurality of helical feeder coils rotatably carried on said shelf means with the axes of said coils extending from front to back with respect to said casing, the articles to be vended being disposed between the convolutions of said helical feeder coils, a plurality of drive means respectively connected to said helical feeder coils for rotating a selected coil in a direction to advance successive articles carried thereby toward said front wall portion, the foremost article moving from said selected feeder coil to said article receiving means, an electric circuit for controlling said drive means including two-position series-connected selection switches and two-position series-connected bypass switches, one of said selection switches and one of said bypass switches being in operative circuit relationship with each of said drive means, each of said selection and bypass switches being normally maintained in one position for holding the circuit through the corresponding drive means open, the drive means for the selected feeder coil being actuated upon the movement of the associated selection switch to its other position, means operated by the actuated drive means for moving the associated bypass switch to its other position to continue the operation of said actuated drive means for a length of time sufficient to rotate said selected feeder coil through a single complete revolution, said associated bypass switch returning to its said one position as the selected feeder coil completes its revolution to arrest the operation of the drive means therefor, and means for guiding said selected feeder coil as it rotates, said last-mentioned means including a generally semi-cylindrical portion disposed at least partly within the selected coil and having a radius of curvature which is less than that of said selected coil.

15. An article vending machine of the character set forth in claim 14, in which each of said drive means comprises a positive brake motor that stops substantially instantaneously upon the return of the associated bypass switch to said one position.

16. An article vending machine of the character set forth in claim 14, in which each of said drive means includes an output shaft in driving relationship with the corresponding feeder coil, the means for moving the associated bypass switch comprising cam means carried by said output shaft.

17. An article vending machine comprising, in combination, a casing including a front wall portion having a delivery opening therein, article receiving means supported by said casing adjacent said delivery opening, first door means normally closing said delivery opening but manually movable to an open position to permit access to articles received by said article receiving means, shelf means positioned within said casing above said delivery opening, a helical feeder coil rotatably carried by said shelf means with the articles to be vended disposed between the convolutions of said coil, the axis of said helical feeder coil extending from front to back with respect to said casing, a discharge chute mounted within said casing for transporting successive articles carried by said helical feeder coil to said article receiving means, means for rotating said helical feeder coil in a direction to advance a selected article carried thereby toward said discharge chute and said article receiving means, said selected article being received by said article receiving means for withdrawal through said delivery opening upon the movement of said first door means to said open position, second door means interposed between said first door means and said helical feeder coil for preventing access to the articles carried thereby when said first door means is in said open position, said first door means being slidably supported by said casing wall portion and said second door means being pivotally supported by said article receiving means between said discharge chute and said delivery opening, linkage means interconnecting said first door means and said second door means for closing the latter in response to the movement of said first door means to said open position, and means extending at least partly within said helical feeder coil for guiding the same as it rotates.

18. An article vending machine comprising, in combination, a casing including a front wall portion having a viewing opening and a delivery opening beneath said viewing opening, article receiving means supported by said casing adjacent said delivery opening, shelf means positioned within said casing in spaced relationship with said article receiving means, support means for mounting said shelf means within said casing, said support means including cooperating rail members for enabling the selective withdrawal of said shelf means entirely from said casing and the sliding of said shelf means to a partially withdrawn position, a helical feeder coil rotatably carried by said shelf means, the axis of said helical feeder coil being located at the level of said viewing opening and extending from front to back with respect to said casing, the articles to be vended being disposed between the convolutions of said coil with the foremost article visible through said viewing opening, means supported adjacent one end of said helical feeder coil for rotating the same in a direction to advance said foremost article toward said article receiving means, and guide means of low friction material disposed at least partly within said helical feeder coil and supported adjacent the other end thereof for guiding the same as it rotates.

(References on following page)

References Cited

UNITED STATES PATENTS

| | | | |
|---|---|---|---|
| 214,929 | 4/1879 | Locke et al. | 198—213 |
| 339,561 | 4/1886 | Locke | 198—213 X |
| 921,763 | 5/1909 | Weed | 221—75 |
| 1,185,356 | 5/1916 | Weaver | 221—29 |
| 1,986,714 | 1/1935 | Clayton | 194—10 |
| 2,180,639 | 11/1939 | McMahon et al. | 194—12 X |
| 2,240,928 | 5/1941 | Hamel | 312—36 |
| 2,590,736 | 3/1952 | Tandler et al. | 194—10 |
| 2,599,173 | 6/1952 | Hamilton | 194—10 |
| 2,777,603 | 1/1957 | Baum | 221—84 |
| 2,925,194 | 2/1960 | Mihalek | 221—130 X |
| 2,975,935 | 3/1961 | Hebel | 221—130 X |
| 2,987,170 | 6/1961 | Hamilton | 198—213 |
| 2,990,227 | 6/1961 | McCaleb | 312—35 |
| 3,085,711 | 4/1963 | Holstein et al. | 221—75 |
| 3,164,294 | 1/1965 | Phillips et al. | 221—125 X |
| 3,174,646 | 3/1965 | Johnson | 221—129 |
| 3,178,055 | 4/1965 | Schuller | 221—75 |
| 3,269,595 | 8/1966 | Krakauer et al. | 221—75 |

ROBERT B. REEVES, *Primary Examiner.*

KENNETH N. LEIMER, *Examiner.*